United States Patent Office.

G. G. GARIBOLDI, OF BUFFALO, NEW YORK.

Letters Patent No. 67,868, dated August 20, 1867.

IMPROVED MARBLE CEMENT.

*The Schedule referred to in these Letters Patent and making part of the same.*

TO ALL WHOM IT MAY CONCERN:

Be it known that I, G. G. GARIBOLDI, of the city of Buffalo, county of Erie, and State of New York, have invented a new and improved Marble Cement, as a finish for the outer and inner walls of buildings; and I do hereby declare that the following is a full and exact description of the manner of compounding, and applying, and using the same, sufficient to enable others skilled in the art to make, apply, and use the same.

The nature of my invention consists in a new combination of ingredients, and in the manner of applying and using the same.

The walls of a building being made of brick or stone, I in the first place make a mortar of lime and sand mixed in about equal proportions, and apply a coat of this directly to the wall. This coat may be of a rough-cast, and should be thoroughly dried before the second coat is applied. I then prepare a mortar for a second coat, composed of fine sand, marble dust, and white lime, mixed in equal proportions, or nearly so. This is spread on over the first coat. I then immediately prepare a mortar for a third coat, which is composed of equal proportions of lime and marble dust, and one third the quantity of either, of soap, and sufficient coloring matter of quality and quantity to give the compound any base or ground color desired. These ingredients are thoroughly mixed together and quickly applied with proper trowels, giving the surface a smooth finish. Then the wall is painted in different colors and shadings, and striped in imitation of marble, free-stone, granite, or any other kind or quality of stone, or any design. Then the wall is polished with a hot trowel or other suitable heated tool, giving it a perfect polished finish, like polished marble or other polished stone.

This compound makes a hard and beautiful cement wall, which is suitable for the inner or outer walls of dwellings or other buildings. It will stand washing, and is durable, like marble or other stone, in all climates. It makes a very cheap and beautiful wall. Any color or design which the skill of the artist may suggest, may be made, and as durable, or nearly so, as the wall itself.

Partition walls inside of buildings made in the usual way of studs and lathing, may be wholly covered with this cement in the manner above described, or it may be, if desired, put on over old plaster walls, by first roughing the old wall.

What I claim as my invention, and desire to secure by Letters Patent, is—

A marble cement made, applied, and used in the manner substantially as herein described.

G. G. GARIBOLDI.

Witnesses:
B. H. MUEHLE,
EDW. WILHELM.